Sept. 27, 1932.  L. J. BLACK  1,879,049
WATER COOLED WINDING DRUM
Filed Aug. 3, 1929  2 Sheets-Sheet 1
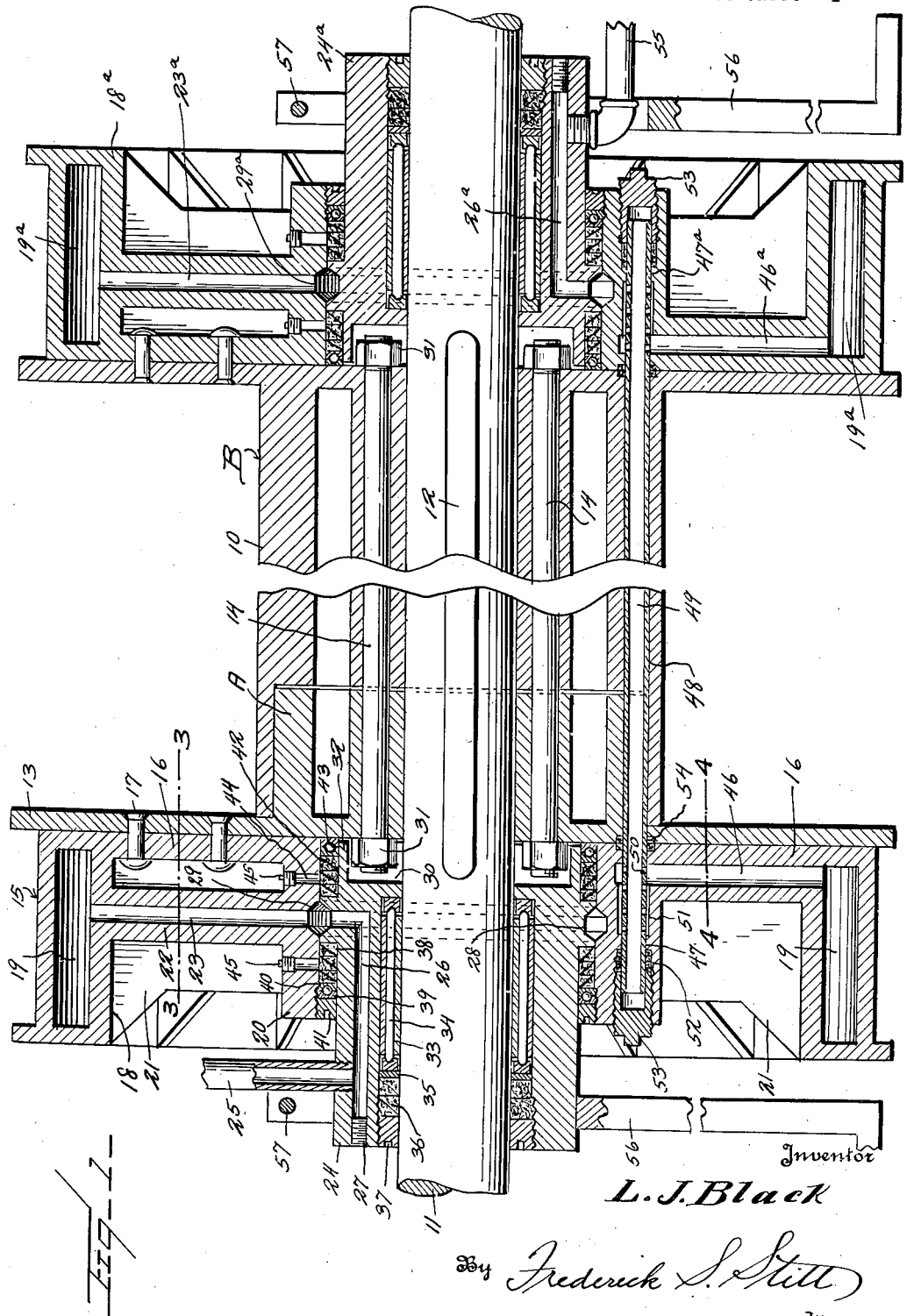
Inventor
L. J. Black
By Frederick S. Stitt
Attorney Sept. 27, 1932. L. J. BLACK 1,879,049
WATER COOLED WINDING DRUM
Filed Aug. 3, 1929 2 Sheets-Sheet 2
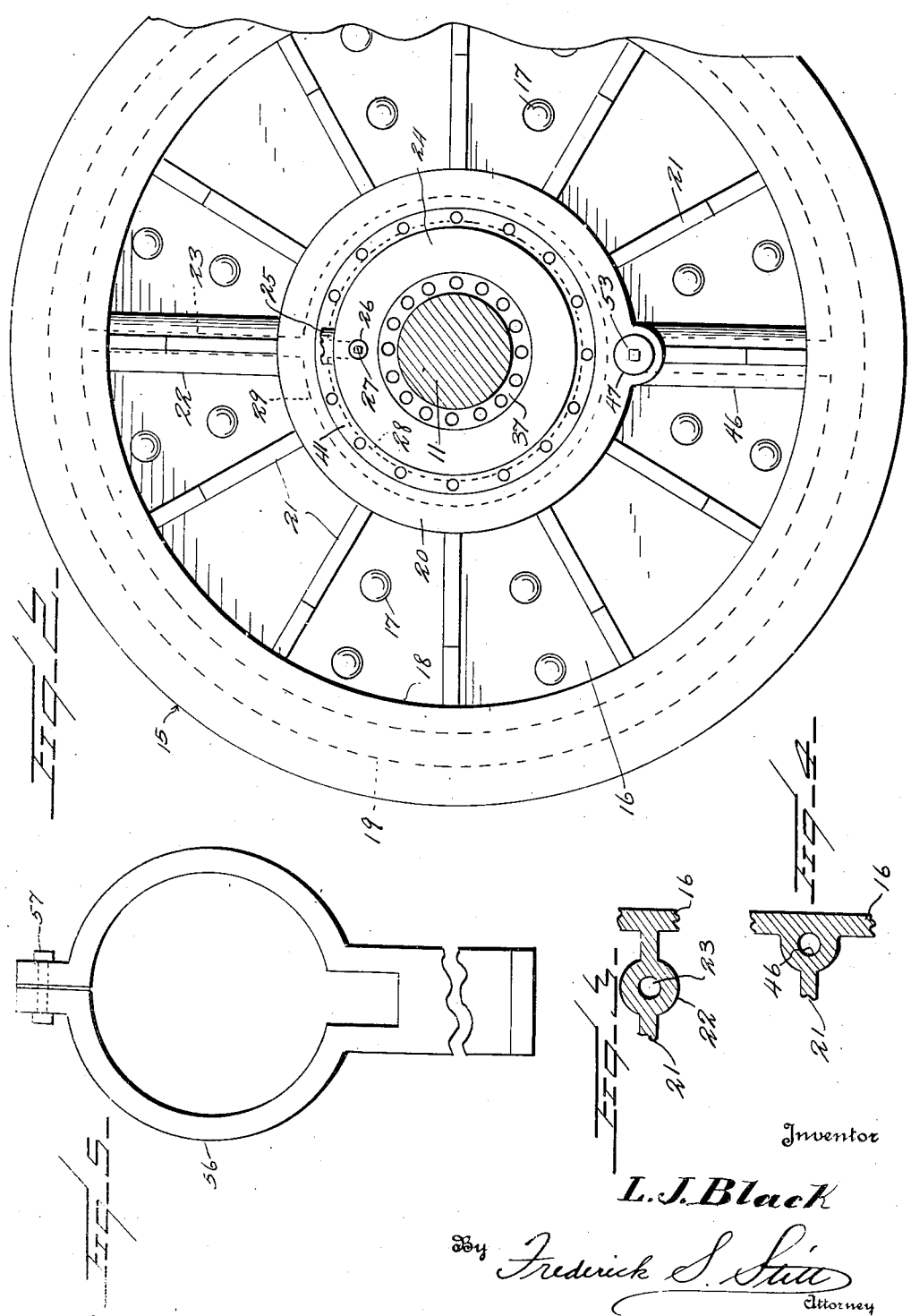
Inventor
L. J. Black
By Frederick S. Still
Attorney Patented Sept. 27, 1932

1,879,049

UNITED STATES PATENT OFFICE

LEE J. BLACK, OF BEAUMONT, TEXAS

WATER COOLED WINDING DRUM

Application filed August 3, 1929. Serial No. 383,389.

This invention relates to the winding drums of draw works and particularly to those winding drums having a hollow brake rim through which water circulates. In practically all winding drums of this character known to me the shaft of the winding drum at each end is formed with a bore for the admission and discharge of cooling liquid such as water. The forming of the shaft on these bores is expensive and tends to weaken the shaft. One of the objects of the present invention is to eliminate the necessity of these axial bores in the shaft upon which the drum is mounted and provide instead water inlet and outlet members which are swiveled to the drum, the drum on its brake flange being provided, of course, with circulating passages.

A further object is to provide for this purpose a bushing which surrounds the shaft and is held against rotation, this bushing delivering the cooling liquid and taking cooling liquid from the brake flanges of the brake drum and in this connection provide means for packing the bushing to prevent leakage of water, which means will permit the ready removal of the packing and the ready replacement thereof whenever desired and the tightening up of the packing from time to time.

Other objects will appear in the course of the following description.

My invention is illustrated in the accompanying drawings, wherein:—

Figure 1 is a longitudinal sectional view of a brake drum provided with my improved circulating system;

Figure 2 is an elevation with the shaft in section;

Figure 3 is a fragmentary section on the line 3—3 of Figure 1;

Figure 4 is a fragmentary section on the line 4—4 of Figure 1;

Figure 5 is an end elevation of the bushing holding means.

Referring to these drawings, 10 designates the center or core of the drum and 11 the shaft upon which the drum is mounted, the drum being held to the shaft by keys 12 or by equivalent means. The drum is provided with the usual main drum flanges designated 13 on each end of the drum proper. As illustrated, the drum 10 is formed in two sections A and B, each of these sections having a drum flange 13, the sections being held together by the tie rods 14. Riveted, bolted or otherwise engaged with the main drum flanges 13, are the brake drums or brake rims which are designated generally 15. Each of these is formed with the inner flange or disk 16 through which the rivets 17 pass and with the hollow brake flanges 18 having a circumferential chamber 19 formed therein.

Each brake flange is formed with a hub portion 20. The brake flange 18 is connected to the hub portion by means of the webs 21. At one point, for each brake flange, there is provided a tubular spoke 22 which is formed to provide a duct 23 leading inward to the inner surface of the hub 20 of the brake flange.

Between the shaft 11 and this hub 20, there is disposed a bushing 24 annular in cross section, of course, which bushing is formed to provide at one point in its circumference a longitudinally extending duct 26 which extends to the end of the bushing and is closed by the plug 27. Adjacent the outer end of the bushing and exteriorly of the hub 20, there is provided the water inlet pipe 25 which opens into the duct 26 and adjacent the inner end of the bushing the duct 26 is radially extended and opens into a circumferential groove 28. This groove confronts a circumferential groove 29 formed in the inner face of the hub 20 and into which the duct 23 opens. The bushing 24 is held from rotation while the drum and the brake flanges rotate around the bushing 24 but the circumferential channels 28 and 29 are in continual communication with each other so that water passing through the pipe 25 and duct 26 will pass into the duct 23 and thus into the hollow brake rim 19. The inner end of the hub 24 is cut away at 30 to accommodate the nuts 31 on the ends of the tie rods 14 and this leaves an annular projection 32 on the inner end of the bushing which is approximated to the outer end face of the drum section A or B.

Disposed between the exterior face of the shaft 11 and the interior face of the bushing 24 are the rings 33 between which is disposed the rollers 34, these rings and the roller 34 constituting a roller bearing or anti-friction bearing between the shaft and the bushing 24.

Outward of the roller bearings there is disposed a bronze ring 35 and exteriorly of this bronze ring there is disposed annular packing rings 36 which surround the shaft and fit between the shaft and bushing and exteriorly of the packing 36 there is disposed the packing nut 37 which has screw-threaded engagement with the bushing. It will thus be seen that the packing nut 37 may be turned to compress the packing rings 36. Disposed between the hub 20 of the brake flange and the exterior face of the bushing are the packing rings 38 and bearing against the ends of the packing rings are the ball bearing rings 39 between which are disposed the anti-friction balls 40. Exteriorly of this ball bearing is a screw plug 41. At the inner end of the bushing there is provided the packing rings 42 which bear against the anti-friction elements 43. Extending through the hub 20 are passages 44 opening against the packing rings and at their outer ends closed by grease plugs 45 so that the packing rings may be kept impregnated with grease.

Diametrically opposite the duct 23 the rim or brake flange 15 has a radially extending duct 46 which extends inward from the rim and communicates with the longitudinally extending bore 47 formed in the hub of the brake flange, this bore communicating with a corresponding bore 48 formed in the sections of the brake drum extending entirely across the brake drum or core.

Disposed within the bores 47 and 48 is a water circulating pipe 49 which adjacent the bore 47 is formed with a plurality of perforations 50. The bore 47 is cut away at 51 so that quite a number of these perforations are exposed and connected to the duct 46 so as to permit the free circulation of the water.

The bore 47 at its outer end is enlarged so as to receive the packing rings 52 which embrace the pipe 49 and beyond the end of the pipe 49 a packing gland 53 has screw-threaded engagement with the flange and embraces the end of the pipe and bears against the packing 52. Disposed between the drum body and the flange 16 are packing rings 54.

On the opposite side of the drum, there is provided a brake flange 18$^a$ constructed in the same manner as the brake flange 18 and having the bores 19$^a$ and 23$^a$ and the circumferential groove 29$^a$. Disposed within the hub of the brake drum is a bushing 24$^a$ of exactly the same character as the bushing 24 except reversed with regard to the position of the bore 26$^a$. Connected to this bore 26$^a$ is an outlet pipe 55. The outlet end of the drum and brake flange is also provided with a bore 47$^a$ and with the pipe 49 and gland 53 as previously described which is connected by a passage 46$^a$ to the circumferential passage 19$^a$. It is not believed necessary to describe the outlet brake flange as this is precisely the same as the inlet brake flange. The bushings 24 and 24$^a$ may be held from rotation in any suitable manner as for instance the brackets 56 which may be attached to the floor or base and at their upper ends are formed to embrace the bushings 24 and 24$^a$ and clamp thereon by means of the clamp bolts 57.

It will be seen that with this construction the shaft 11 is not formed with axial bores but that a head or bushing is swivelly engaged with the hub of the brake drum at each end. With this construction the water passes into the pipe 25, then along the bore 26 to the circumferential channel 28, thence into the circumferential channel 29, out through bore 23 to the circumferential chamber 19.

It then passes inward through bore 46 and through passages 50 to the water pipe 49, then transversely across the drum to the duct 46$^a$, and thence into the circumferential chamber 19$^a$, thence around the drum through the duct 23$^a$ to the hub, thence into the bushing 24$^a$, thence out through the pipe 55 containing a constant circulation of water through the brake flanges of the two drums.

I do not wish to be limited to the particular manner of conducting water from the hollow brake flange at one end of the drum to the hollow brake flange at the other end of the drum, but I have illustrated for this purpose the construction shown in my pending application for patent, Serial No. 368,916, filed June 6, 1929. With regard to the packing, it will be seen that when the gland 41 is screwed up, it will compress the packing 38. By adjusting the bushing 24, this bushing will compress the packing 42. The roller bearings 39, 40 and 43 will take the thrust of the bushing and reduce friction because in actual practice when the drum is revolving the bushings 24 will, of course, be stationary on shaft 25 and held stationary by the brackets 56. When the drum is in operation, the shaft 11 will be rotating inside of the bushings 24 and 24$^a$ and the drum flanges will be rotating exteriorly of the bushings. The packing rings 38 and 42 will prevent the water from circulating either way. The width of the channels 28 and 29 will be sufficient to permit the bushings 24 and 24$^a$ to be adjusted inward until the inner ends of the bushings come in contact with the hub of the drum flange 13. I have provided, it will be seen, a positive means for forcing the circulation into the flange without the necessity of drilling a hole in the end of the shaft. The lubricating material such as grease from the grease cups 44 will be forced into the packing rings and into the roller bearings, thus providing lubrication at all times.

The grease will pass around the end of the bushing next to the drum flanges 13 and will pass down to the shaft 11 and lubricate the bearings 33. The packing rings 36 prevent the grease discharging into the end of the bushing.

While I have illustrated a construction which I believe to be particularly effective, I do not wish to be limited to this as obviously many changes might be made in the details of construction and arrangement of parts without departing from the spirit of the invention as defined in the appended claims.

I claim:

1. A winding drum having hollow brake flanges and a fluid circulating system therefor, a shaft upon which the winding drum is mounted, and means engaging each end of the drum and fixed from rotation with relation to the drum to continuously discharge fluid into the circulating system of the drum and eject it therefrom.

2. A winding mechanism of the character described including a shaft having a drum thereon, the drum being provided with oppositely disposed hubs, and hollow brake flanges, a fluid circulating system therefor, and means swivelly connected to the hubs for introducing cooling fluid into the circulating system of the drum and flanges and discharging it therefrom.

3. A winding mechanism of the character described including a shaft, a drum mounted thereon having a core, oppositely disposed brake flanges on each end of the drum and having hubs, the flanges, the hubs and the core of the drum having communicating, circulating passages, and means swivelly connected to said hubs whereby cooling fluid may be introduced into one of said hubs and discharged from the other hub.

4. A winding mechanism including a shaft, a drum mounted thereon having a core, the drum at each end of the core having a hub engaging the shaft and having a flange provided with an outstanding hollow brake rim, each hub and flange having an inlet duct leading from the hub into the brake rim and an outlet duct leading from the brake rim into the interior of the hub, and means having swiveled engagement with each hub to introduce and carry off cooling liquid respectively into the ducts of the hub.

5. A winding drum having hollow brake rims, a shaft upon which the drum is mounted and means swiveled to the opposite ends of the winding drum for respectively introducing and carrying off liquids.

6. In a winding drum having hollow brake flanges at its opposite ends, a shaft upon which the drum and flanges are mounted, and means exterior to the shaft for conducting water into one flange through the drum to the interior of the other flange.

7. In a winding drum having hollow brake flanges at its opposite ends, the flanges having hubs, a shaft upon which the hub is mounted and means exterior to the shaft for conducting water into one of said hubs and from the other of said hubs.

8. In a winding drum having hollow brake flanges at its opposite ends, each flange having a hub, a shaft upon which the hub is mounted and bushings upon each end of the drum disposed between the shaft and the hub of the corresponding brake flange, each bushing having a duct opening into the hollow interior of the corresponding brake flange, one of said ducts being for the inlet and the other for the outlet of water, and means extending through the drum conducting water from the hollow interior of one flange to the hollow interior of the other flange.

9. In a winding drum having hollow brake flanges at its opposite ends, each flange having a hub and a radial duct, a shaft upon which the drum is mounted and bushings upon each end of the drum disposed between the shaft and the hub of the corresponding brake flange, each bushing having a duct at its inner end continuously opening into the radial duct of a brake flange, the duct in one of said bushings being connected for the inlet of water and the duct in the other of said bushings being for the discharge of water, and means conducting water through the drum from the hollow interior of one flange to the hollow interior of the other flange.

10. In a winding drum having hollow brake flanges at its opposite ends, each flange having a hub and a radial duct extending from the hollow brake flange and opening upon the inner face of the hub, the inner face of the hub having a circumferentially extending duct into which the radial duct opens, a shaft upon which the drum is mounted and a bushing at each end of the drum surrounding said shaft and disposed between the shaft and the hub of the corresponding brake flange, each of said bushings having a longitudinally extending duct communicating at its inner end with a circumferentially extending duct alining with the circumferential duct of the hub, one of the bushings having its duct connected to a source of water and the duct of the other bushing being for the discharge of water, and means conducting water from the hollow interior of one flange through the drum to the hollow interior of the other flange.

11. In a winding drum having hollow brake flanges at its opposite ends, each flange having a hub and a radial duct extending from the interior of the flange to the inner face of the hub, the inner face of the hub having a circumferential duct into which the radial duct opens, a shaft upon which the drum is mounted, a fixed bushing at each end of the drum and extending into the space between the shaft and the hub, each bushing having a longitudinally extending duct opening upon the outer face of the bushing, said outer face of the bushing having a circumferential duct alining with the circumferential duct of the corresponding hub, anti-friction bearings disposed between the inner face of each bushing and shaft, and a packing disposed between the outer face of each bushing and the inner face of the corresponding hub.

12. In a winding drum having hollow brake flanges at its opposite ends, each flange having a hub and a radial duct extending from the interior of the flange to the inner face of the hub, the inner face of the hub having a circumferential duct into which the radial duct opens, a shaft upon which the drum is mounted, a fixed bushing at each end of the drum and extending into the space between the shaft and the hub, each bushing having a longitudinally extending duct opening upon the outer face of the bushing, said outer face of the bushing having a circumferential duct alining with the circumferential duct of the corresponding hub, anti-friction bearings disposed between the inner face of each bushing and shaft, and a packing disposed between the outer face of each bushing and the inner face of the corresponding hub, including anti-friction bearing members bearing against the packing and an annular gland having screw-threaded engagement with the interior of the hub and bearing against the anti-friction members, the duct in one of said bushings being for the introduction of water and the duct in the other of said bushings being for the outlet of water, and means for conducting water from the hollow interior of one flange through the drum to the hollow interior of the other flange.

13. In a winding drum having hollow brake flanges at its opposite ends, each flange having a hub and a radial duct extending from the interior of the flange to the inner face of the hub, the inner face of the hub having a circumferential duct into which the radial duct opens, a shaft upon which the drum is mounted, a fixed bushing at each end of the drum and extending into the space between the shaft and the hub, each bushing having a longitudinally extending duct opening upon the outer face of the bushing, said outer face of the bushing having a circumferential duct alining with the circumferential duct of the corresponding hub, anti-friction bearings disposed between the inner face of each bushing and shaft, and a packing disposed between the outer face of each bushing and the inner face of the corresponding hub, including anti-friction bearing members bearing against the packing and an annular gland having screw-threaded engagement with the interior of the hub and bearing against the anti-friction members, the duct in one of said bushings being for the introduction of water and the duct in the other of said bushings being for the outlet of water, and means for conducting water from the hollow interior of one flange through the drum to the hollow interior of the other flange, said means including a longitudinally extending pipe extending through the drum and flanges, the flanges having radial ducts opening into the outer surface of said pipe and the pipe being perforated at this point and a packing gland having screw-threaded engagement with the flange surrounding the end of the said pipe and packing against which the inner end of the gland bears when surrounding said pipe.

14. In a winding drum having hollow brake flanges at its opposite ends, each flange having a hub and a radial duct extending from the hollow brake flange to the interior face of the hub, the interior face of each hub having a circumferential channel into which the duct opens, a shaft upon which the drum is mounted, a bushing at each end of the drum disposed outward of the shaft and extending into the space between the shaft and the corresponding brake flange, each bushing having a longitudinally extending duct and a circumferential channel into which the duct opens, the channel being in alinement with the channel in the corresponding brake flange hub, each bushing between said channel and the body of the drum being reduced in diameter, packing rings disposed in the space thus formed, anti-friction elements disposed between the end of the drum and said packing rings, the inner end of the bushing terminating short of the corresponding end of the drum, means for lubricating said packing rings, packing rings disposed between the bushing and the inner face of said hub outward of said circumferential channel, anti-friction means bearing against the ends of the packing rings, a gland having screw-threaded engagement with each hub and bearing against the corresponding anti-friction means and the packing, means for lubricating the packing, a packing disposed between the shaft and the interior face of the bushing and bearing against the first-named anti-friction means, a gland for tightening said packing, and means conducting water from the hollow interior of the flange through the drum to the hollow interior of the other flange.

15. A winding drum having hollow brake flanges and a fluid circulating system therefor, a shaft upon which the drum is mounted, stationary members in which the shaft rotates, sealing means between the shaft and the stationary members preventing leakage, one of the stationary members having a fluid inlet connection to the fluid circulating system of the winding drum brake flanges, and the other stationary member having a fluid outlet connection for the fluid circulating system.

16. A winding mechanism of the character described, including a shaft having a drum thereon, the drum being provided with oppositely disposed hubs and hollow brake flanges and with a fluid circulating system for the hubs and flanges, stationary members at each end of the drum in which the shaft rotates, sealing means between the hubs and the drum and the stationary members, one of the stationary members having a fluid inlet connection delivering fluid to one end of the circulating system and the other of the stationary members having a fluid outlet connection taking fluid from the circulating system whereby to provide continuous circulation of the cooling fluid regardless of the direction of rotation of the drum.

17. A winding drum having hollow brake flanges, and a fluid circulating system therefor, a shaft upon which the winding drum is mounted, and means extending into each end of the drum and fixed from rotation with the drum and shaft for continuously receiving and discharging a cooling fluid into and out of the circulating system for the hollow brake flanges.

18. A winding drum having hollow brake flanges and having a fluid circulating system therefor, a shaft upon which the drum is mounted, means at each end of the drum and disposed within the interior of each end of the drum for continuously receiving and ejecting the cooling fluid from the circulating system and stationary means at each end of the drum and within which the shaft is rotatable permitting the admission of fluid at one end of the drum to the circulating system thereof and ejecting the fluid at the other end of the drum from the circulating system thereof, said means being sealed to each end of the drum.

19. A winding drum having brake rims and a fluid circulating system therefor, a shaft upon which the drum is mounted, and fixed means rotatably connected to the shaft and to each end of the drum to direct cooling fluid into the circulating system of the drum and discharge it therefrom.

20. A winding mechanism of the character described, including a solid shaft having a drum thereon having oppositely disposed hubs, flanges, brake rims, and a fluid circulating system therefor, and means swivelly connected to the hubs for introducing cooling fluid into the circulating system of the drum and discharging it therefrom.

In testimony whereof I affix my signature.
LEE J. BLACK.